United States Patent [19]

Stahl

[11] Patent Number: 5,415,234
[45] Date of Patent: May 16, 1995

[54] ROTOR TILLER SKIRT ASSEMBLY

[76] Inventor: Frank A. Stahl, 477 Howe Rd., Kent, Ohio 44240

[21] Appl. No.: 80,370

[22] Filed: Jun. 21, 1993

[51] Int. Cl.$^6$ .............................................. A01B 33/00
[52] U.S. Cl. .................................. 172/112; 172/508; 172/517; 172/81
[58] Field of Search .............. 172/112, 508, 509, 512, 172/513, 517, 81; 171/112; 56/320.1, DIG. 24

[56] References Cited

U.S. PATENT DOCUMENTS

| | | | |
|---|---|---|---|
| 2,959,231 | 11/1960 | Heilman | 172/42 |
| 3,901,325 | 8/1975 | Richards | 172/81 |
| 3,978,929 | 9/1976 | Clark | 172/42 |
| 3,985,185 | 10/1976 | Pierce | 172/81 |
| 3,985,186 | 10/1976 | Lee | 172/81 |
| 4,592,428 | 6/1986 | Whitney | 172/81 |
| 4,664,201 | 5/1987 | Pegoraro | 172/112 |

Primary Examiner—Randolph A. Reese
Assistant Examiner—Christopher J. Novosad
Attorney, Agent, or Firm—Reese Taylor

[57] ABSTRACT

A skirt assembly (20) for a rotor tiller (10) includes a pair of shields (21,22) positioned substantially vertically at the outer extremities of the tines; and a framework (23). The framework (23) includes a pair of strap members (24,24) mounted to the deck (17) of the rotor tiller (10) on either side of the motor (14), a plurality of cross members (26,26) operatively engaging the pair of strap members (24,24) and extending beyond the sides of the tiller (10), a plurality of suspension members (28,28) connected to the pair of shields (21,22), and a T-shaped connector (27) to operatively connect each suspension member (28) to at least one of the cross members (26).

20 Claims, 3 Drawing Sheets

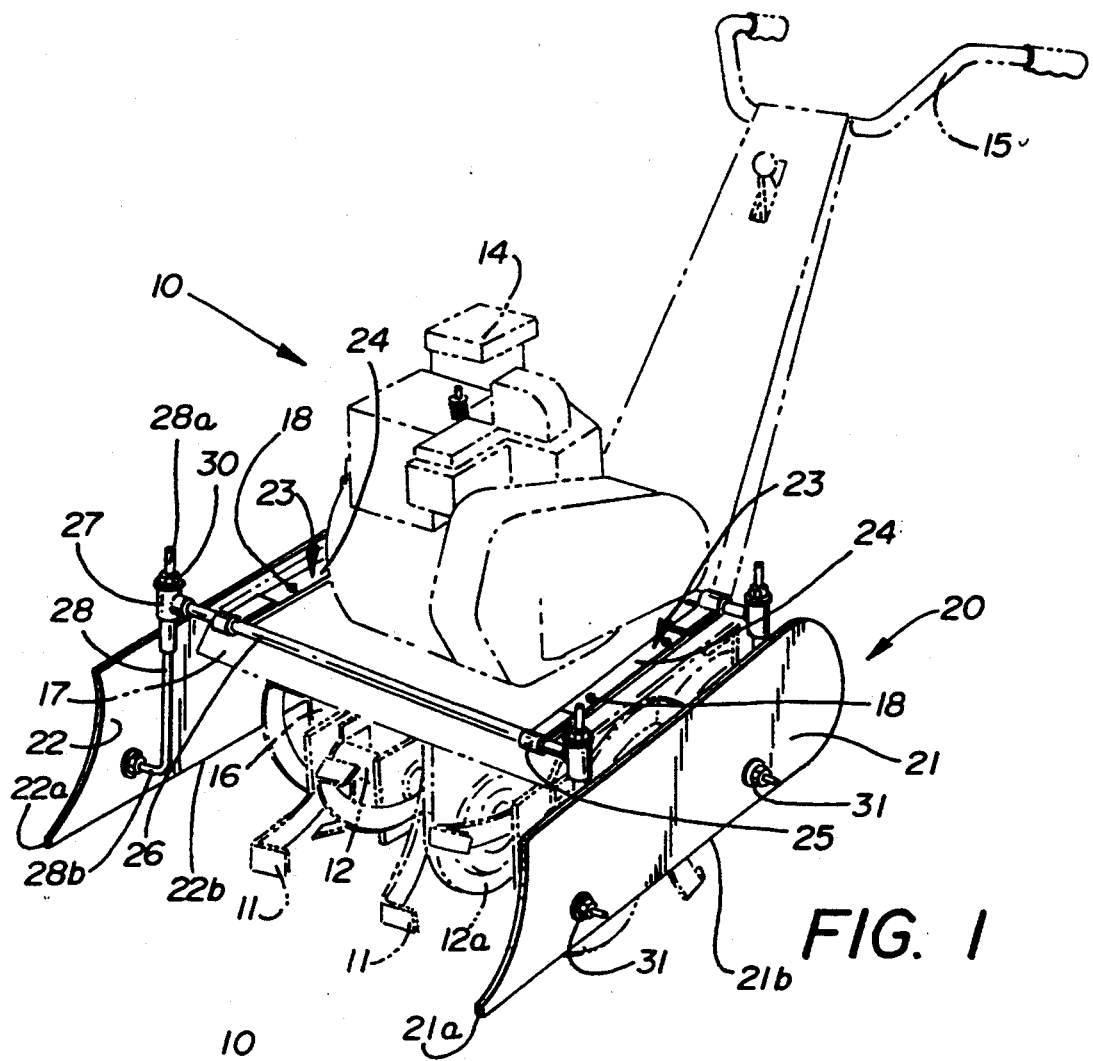
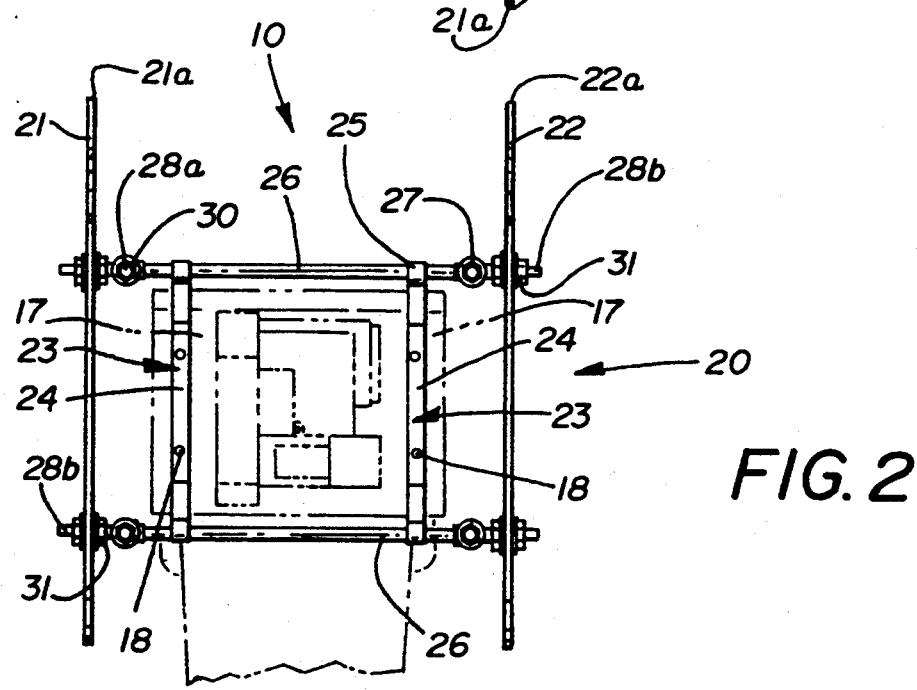
FIG. 1
FIG. 2

ROTOR TILLER SKIRT ASSEMBLY

BACKGROUND OF THE INVENTION

This invention relates in general to rotor tillers or cultivators. More particularly, this invention relates to a skirt assembly comprising a pair of shields disposed along the sides of a rotor tiller which prevent plants from being covered with dirt or entangled with the tines of the rotor tiller during operation of the tiller. Specifically, the invention relates to a skirt assembly having a pair of shields connected by a framework which may be installed on the guard panel or deck of a rotor tiller either in the course of manufacturing or by retrofitting it onto an existing tiller, the shields of which are individually adjustable and free-floating.

DESCRIPTION OF THE PRIOR ART

Rotor tillers have long been used to plow and cultivate gardens and the like. There are several different types of rotor tillers. For instance, some rototillers have tines or soil churning members located at the rear of the tiller behind the wheels and motor such as are found in Whitney U.S. Pat. No. 4,592,428, while others have them at the front of the tiller below the motor.

Several rotor tillers are known to have accessories which shield the plants being cultivated from the tines or soil churning members. However, some of these devices are not capable of shielding plants on both sides of the device. For example, Heilman U.S. Pat. No. 2,959,231 discloses a device which may be used either as a cultivator or as a harrow. When used as a cultivator, the device may include a pair of accessory units or shields which protect plants when the cultivator is astride the plant rows, not between the rows. Also, Clark U.S. Pat. No. 3,978,929 shows a rotor tiller having a wheeled attachment assembly fitted on one side of the tiller to lift vines and vegetative matter away from the blade of the attachment. This particular tiller requires a much larger row width in order to be useful and is only concerned with one side of the tiller.

Nevertheless, other rotor tillers have been developed which do employ shields on both sides of the tillers. However, several of these rotor tillers have the shields connected in some manner to the axle or shaft on which the tines operate. For example, Richards U.S. Pat. No. 3,901,325 and Lee U.S. Pat. No. 3,985,186 both show shields connected to the tiller in such a manner. Such a design permits the shields to pivot around the tine shaft, but it also prevents the shields from being adjusted at the sides of the tiller, and therefore, these rotor tillers may not be suitable for use at all times during the season, especially when the plants are quite small. Moreover, because the shields are connected to the tine shaft and the tines are limited as to the depth to which they may disrupt the soil, the vertical positioning of the shields is also fixed.

Finally, Pierce U.S. Pat. No. 3,985,185 relates to a tiller having a pair of shield plates on both sides of the tiller and which employs a supporting device mounted on the frame of the tiller rather than the shaft of the tines. The plates are adjustable to predetermined, spaced positions by connecting them with the adjustment arms. Clearly, however, the shield plates are not free floating. Again, this may cause problems when cultivating while the plants are very small or when cultivating where the land is sloped or uneven.

Thus, despite the wide variety of shields for rotor tillers known today, none provide a suitable device for protecting plants from the tines of the tiller from the time of their earliest stages of growth. Such a skirt assembly should be adjustable and free-floating in order to protect the plants.

SUMMARY OF INVENTION

It is, therefore, an object of the present invention to provide a skirt assembly for a rotor tiller which will permit cultivation of the soil very early and very late in the growing season.

It is another object of the present invention to provide a skirt assembly, as above, which is adjustable and free floating so as to permit the tiller to cultivate land of any contour.

It is yet another object of the present invention to provide a skirt assembly, as above, which allows the rotor tiller to plow deeper and closer to the rows of plants for more effective weed control.

It has been found that these objects can be achieved by providing, in combination with a rotor tiller having opposed sides, a deck and tines positioned in the front beneath a motor, a skirt assembly comprising a pair of shields positioned substantially vertically at the outer extremities of the tines, and a framework. The framework includes a pair of strap members mounted to the deck of the rotor tiller on either side of the motor, a plurality of cross members operatively engaging the pair of strap members and extending beyond the sides of the tiller, a plurality of suspension members connected to the pair of shields, and means to operatively connect each suspension member to at least one of the cross members.

Accordingly, production of a skirt assembly for a rotor tiller of the type above-described becomes the principal object of the invention with other objects thereof becoming more apparent upon a reading of the following brief specification considered and interpreted in view of the accompanying drawings.

BRIEF DESCRIPTION OF THE DRAWINGS

FIG. 1 is a perspective view of a skirt assembly of the present invention mounted on a rotor tiller.

FIG. 2 is a top plan view of the skirt assembly of FIG. 1.

PREFERRED EMBODIMENT FOR CARRYING OUT THE INVENTION

Figure 3:
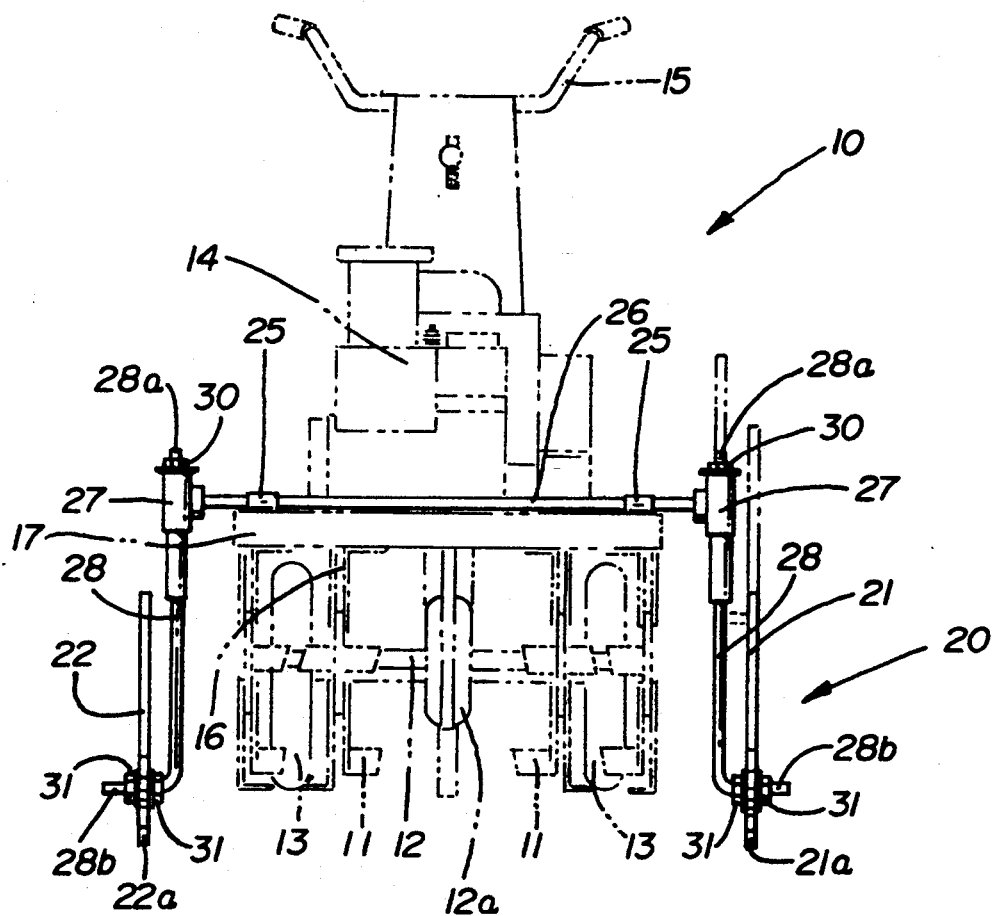
FIG. 3 is front elevational view of the skirt assembly of FIG. 1 mounted on the deck of the rotor tiller of FIG. 1.
Figure 4:
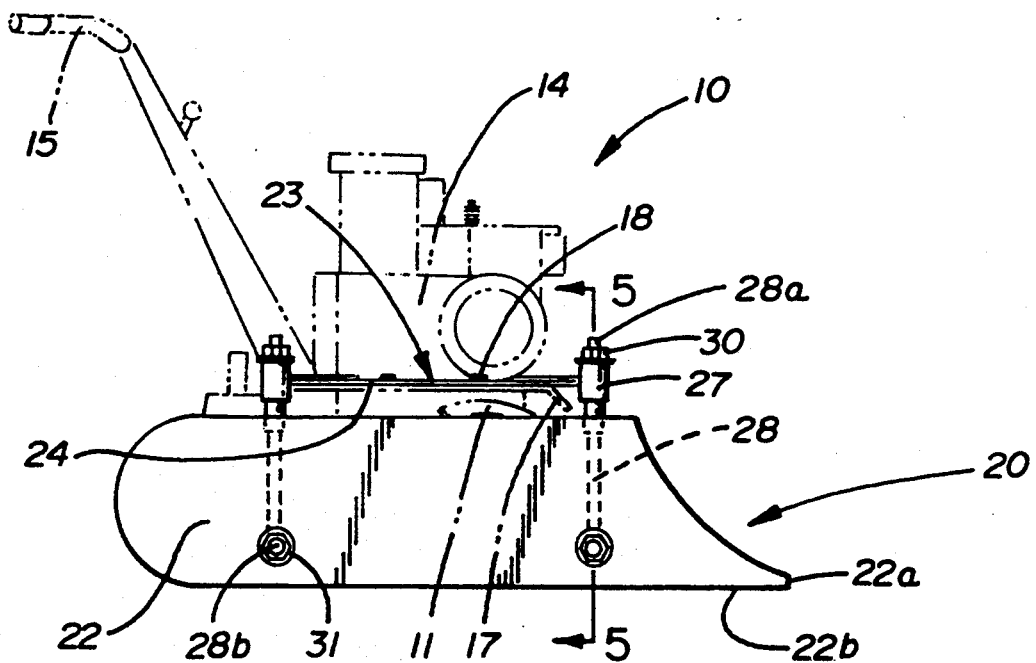
FIG. 4 is a side elevational view of the skirt assembly of FIG. 1 mounted on the deck of the rotor tiller of FIG. 1.
Figure 5:
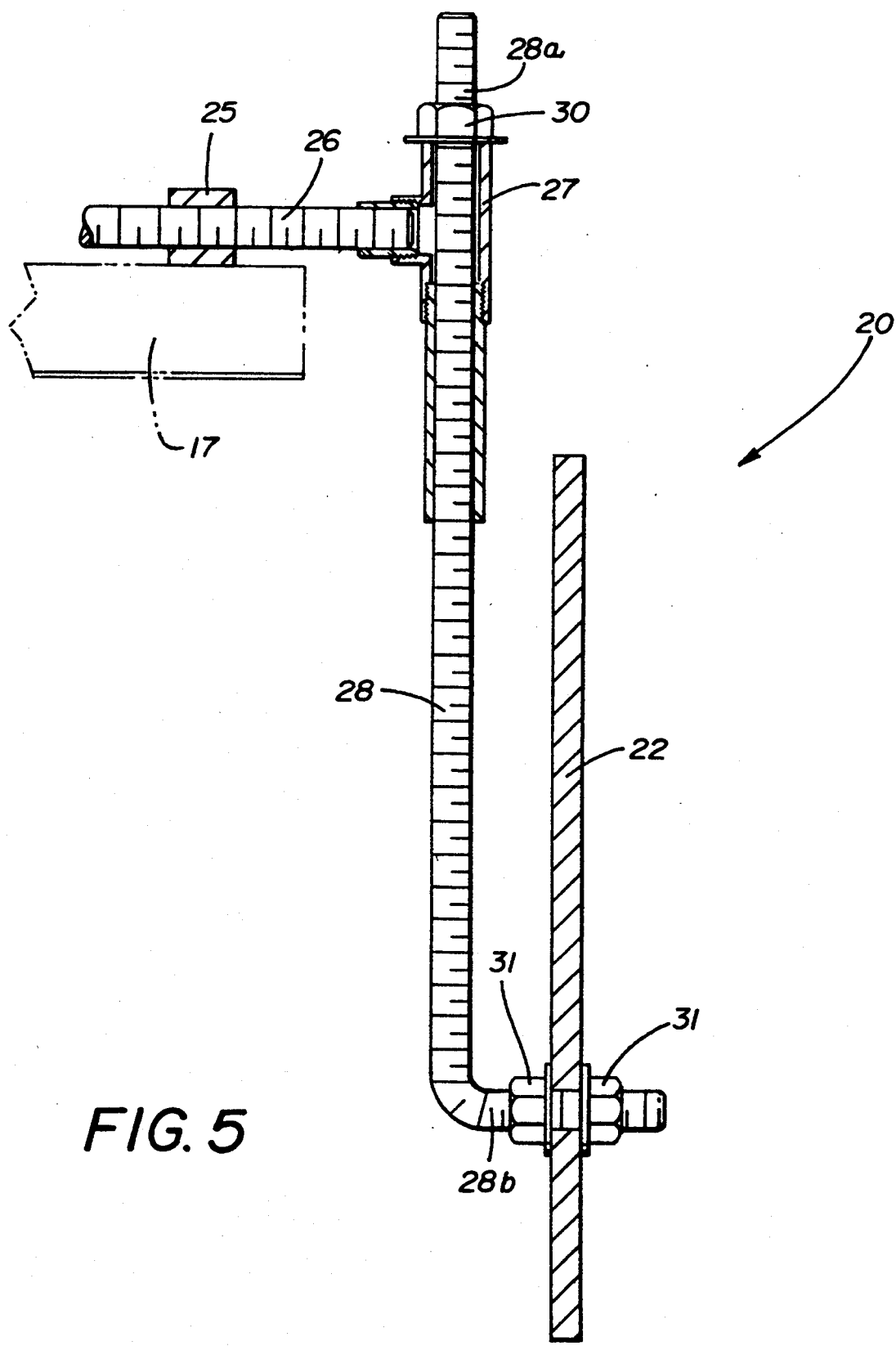
FIG. 5 is a sectional view taken along the line 5—5 of FIG. 4.

A rotor tiller is generally indicated by the numeral 10 in FIG. 1 and includes a skirt assembly generally indicated by the numeral 20 in the drawings. Such a rotor tiller 10 is of the conventional type having a plurality of tines 11 mounted on a driven shaft 12 that extends outwardly from bearing housing 12a positioned in front of wheels 13 and beneath a motor 14. In addition, rotor tiller 10 is equipped with a handle 15 extending from a frame 16 for controlling tiller 10 and a deck or guard panel 17 attached to frame 16 and generally shielding tines 11 from the operator. This construction is essentially conventional and has, thus, not been described in great detail herein.

Skirt assembly 20 includes a pair of shields 21 and 22 which are generally attached to rotor tiller 10 by a framework 23 such that the shields 21 and 22 are positioned substantially vertically in spaced parallel relation to each other. Shields 21 and 22 may be made of any material known in the art such as wood, plastic, metal and the like, and are generally positioned at the sides of tiller 10, or more particularly, beyond the outer extremities of tines 11. Preferably, shields 21 and 22 are flat, sturdy elongated pieces of material having arcuate front edges which preferably come to a point 21a, 22a at the bottom edges 21b, 22b thereof. Such a design facilitates the ready lifting of vines and other vegetative growth out of the way of tines 11 as the soil is being cultivated.

Framework 23 connects shields 21 and 22 to rotor tiller 10. Generally, framework 23 includes a pair of attachment strap members 24, 24 which are connected to the top of deck 17 on either side of motor 14 as by bolts, rivets 18 or the like. Strap members 24, 24 are preferably long strips of metal which are slightly longer than deck 17 in order accommodate and support shields 21 and 22 outboard of the deck. At each end of strap members 23, the material is preferably bent so as to form a bore 25.

A pair of supporting cross members 26, 26 are received through bores 25 defined at each end of strap member 24 and extend outwardly beyond the sides of tiller 10, generally perpendicular to shields 21 and 22. The supporting cross members 26, 26 are preferably threaded rods—the ends of which may be threadably received by one leg of a T-shaped connectors 27, 27 of which four are provided. The one leg of each T-shaped connector 27 operatively receives and is fitted onto an end of cross member 26 in a manner such that the remaining legs of the T-shaped connector 27 extend vertically to receive a free-floating suspension member 28 therethrough. Accordingly, each side of tiller 10 includes a pair of suspension members 28 which may be operatively affixed to shields 21 and 22 such as by a nut and washer combination as shown in FIG. 3.

More specifically, each suspension member 28 is preferably a L-shaped threaded rod which is slidably received through an individual T-shaped connector 27 at its upper end 28a and which extends outwardly for attachment to shields 21 and 22 at its lower end 28b. This attachment is achieved by providing through holes in shields 21 and 22 and securing the lower ends 28b, 28b of suspension members 28, 28 by nuts 31, 31. In order to prevent suspension member 28 from disengaging from T-shaped connector 27, an adjustment nut 30 may be threadably attached to upper end 28a of suspension member 28. It will be appreciated that adjustment nut 30 may be adjusted so as to permit shields 21 and 22 to skim the surface of the ground during operation of tiller 10, and that, because suspension members 28, 28 are individually slidably received through T-shaped connectors 27, shields 21 and 22 are essentially free-floating such that they will rise with the contour of the land. However, because of adjustment nut 30, shields 21 and 22 can never fall below the predetermined adjusted elevation.

Accordingly, as should now be apparent, skirt assembly 20 on rotor tiller 10 will allow the operator to till the soil at a much earlier time in the season as well as a much later time. The shields are always at or close to ground level and therefore, the operator can till deeper into the soil without covering the plants and vegetation with dirt inasmuch as the dirt will not be thrown out of the sides of the tiller. Moreover, the shields are designed to push the full grown plants and vegetation out of the way of the tines and also permit the operator to till much closer to the plants.

Thus, it should be evident that the skirt assembly of the present invention is highly effective in providing protection to the plants and vegetation around which the soil is to be tilled. The invention is particularly suited for rotor tillers, but is not necessarily limited thereto. The skirt assembly of the present invention can be used separately with other cultivating equipment such as tractors or the like.

Furthermore, it will be appreciated that skirt assembly 20 of the present invention may be installed on guard panel or deck 17 of rotor tiller 10 either in the course of manufacturing or by retrofitting it onto an existing tiller.

While a full and complete description of the invention has been set forth in accordance with the dictates of the Patent Statutes, it should be understood that any modifications can be resorted to without departing from the spirit hereof or the scope of the appended claims.

Thus, it is again noted that the rotor tiller illustrated in the drawings represents only a certain type of rotor tiller and the any rotor tiller having a deck may be applicable to the inventive concept disclosed and claimed.

Furthermore, while some particular materials have been mentioned by way of illustration, it will be apparent that the invention is not intended to be so limited and other materials having the characteristics described herein may be substituted therefor.

What is claimed is:

1. In combination with a cultivator having opposed sides, a deck, a motor and cultivating implements disposed beneath the deck, a skirt assembly comprising:
   a) a framework attached to the deck and projecting outwardly and downwardly therefrom;
   b) a pair of opposed shields adjustably attached to said framework outboard of the cultivating implements for controlled vertical free floating movement relatively of said framework during operation of the cultivator; and
   c) means for controlling the extent of movement of said shields relatively of said framework.

2. The combination of claim 1 wherein said framework includes strap members mounted to the deck; and cross members engaging said strap members and extending beyond the sides of the cultivator.

3. The combination of claim 2 wherein said framework includes a plurality of elongate suspension members each operatively connected adjacent one end to said cross members; and said shields are attached to the opposed ends of each of said suspension members.

4. The combination of claim 3, wherein T-shaped connectors interconnect said cross members and said suspension members, each said connector being capable of securely receiving one end of one of said cross members and slidably receiving one end of each of said suspension members.

5. The combination of claim 4, wherein each said T-shaped connector receives said cross member and has a normally vertically disposed leg; such that one of said suspension members is slidably received vertically in each said normally vertically disposed leg.

6. The combination of claim 5, wherein each said suspension member is individually slidably received through its associated T-shaped connector.

7. The combination of claim 1, wherein said skirt assembly further comprises means to adjust the elevation of said shields.

8. The combination of claim 7, wherein said shields are connected to said framework by suspension members; and said means to adjust is a nut threadably received at the upper end of each said suspension member.

9. The combination of claim 1, wherein said shields include means to lift plants and vegetation away from the tines of the rotor tiller; said means including tapered forward edges.

10. A skirt assembly for use with a cultivator, comprising:
 a) a pair of shields spaced apart and generally parallel to each other;
 b) a pair of strap members spaced apart and generally parallel to each other and to said pair of shields for attachment to the cultivator;
 c) a plurality of cross members operatively engaging said pair of strap members and extending therebeyond generally perpendicular to said pair of shields;
 d) a plurality of adjustable and free-floating suspension members connected to said cross members and fixed to said pair of shields for controlled movement of said shields relatively of said strap members during operation of the cultivator; and
 e) means carried by each said suspension member to control the extent of movement of said suspension members relatively of said strap members.

11. The skirt assembly of claim 10, wherein said means to operatively connect includes a plurality of T-shaped connectors, each said connector being capable of securely receiving one end of one of said cross members and slidably receiving one end of one of said suspension members.

12. The skirt assembly of claim 10, wherein each said T-shaped connector receives its associated cross member and has a normally vertically disposed leg such that one of said suspension members is slidably received vertically in each said normally vertically disposed leg.

13. The skirt assembly of claim 12, wherein each said suspension member is individually slidably received through its associated T-shaped connector.

14. The skirt assembly of claim 10, further comprising means to adjust the elevation of said shields.

15. The skirt assembly of claim 14, wherein said means to adjust is a nut threadably received at the upper end of each said suspension member.

16. In combination with a cultivator having opposed sides, a deck, a motor and cultivating implements disposed beneath the deck, a skirt assembly comprising:
 a) a framework attached to the deck and projecting outwardly and downwardly therefrom;
 b) a pair of opposed shields adjustably attached to said framework outboard of the cultivating implements for controlled free floating movement relatively of said framework;
 c) said framework including strap members mounted to the deck;
 d) cross members engaging said strap members and extending beyond the sides of the cultivator;
 e) said framework further including a plurality of elongate suspension members each operatively connected adjacent one end to said cross members;
 f) said shields being attached to the opposed ends of each of said suspension members;
 g) T-shaped connectors interconnecting said cross members and said suspension members, each said connector being capable of securely receiving one end of one of said cross members and slidably receiving one end of each of said suspension members; and
 h) each of said T-shaped connector receives said cross member and has a normally vertically disposed leg such that one of said suspension members is slidably received vertically therethrough.

17. The combination of claim 16, wherein each said suspension member is individually slidably received through its associated T-shaped connector.

18. The combination of claim 16, wherein said shields include means to lift plants and vegetation away from the cultivating implements, said means including tapered forward edges.

19. A skirt assembly for use with a cultivator, comprising:
 a) a pair of shields spaced apart and generally parallel to each other;
 b) a pair of strap members spaced apart and generally parallel to each other and to said pair of shields for attachment to the cultivator;
 c) a plurality of cross members operatively engaging said pair of strap members and extending therebeyond generally perpendicular to said pair of shields;
 d) a plurality of adjustable and free-floating suspension members connected to said pair of shields for controlled movement relatively of said strap members;
 e) means to operatively connect each said suspension member to at least one of said cross members; and
 f) each said T-shaped connector receives its associated cross member and has a normally vertically disposed leg such that one of said suspension members is slidably received vertically therethrough.

20. The skirt assembly of claim 19 wherein each said suspension member is individually slidably received through its associated T-shaped connector.

* * * * *